United States Patent [19]

Chang

[11] 4,220,541
[45] Sep. 2, 1980

[54] FILTER FOR BREWING COFFEE OR THE LIKE

[76] Inventor: Soo-Duck Chang, Birger Jarlsgaten 112, Stockholm, Sweden, 11420

[21] Appl. No.: 865,204

[22] Filed: Dec. 28, 1977

[51] Int. Cl.² ............................................. B01D 23/02
[52] U.S. Cl. ................................. 210/474; 210/497 R
[58] Field of Search .............. 210/470, 473, 474, 481, 210/483, 497 FB, 497 R

[56] References Cited
U.S. PATENT DOCUMENTS

| | | | |
|---|---|---|---|
| 752,019 | 5/1903 | Adwen | 210/497 FB |
| 3,567,033 | 3/1971 | Whelan | 210/497 FB |
| 3,741,397 | 6/1973 | Gerson et al. | 210/497 FB |
| 4,064,053 | 12/1977 | Gerson et al. | 210/497 FB |

Primary Examiner—William A. Cuchlinski, Jr.
Attorney, Agent, or Firm—Holman & Stern

[57] ABSTRACT

A filter for exterior supportless brewing of coffee and the like consisting of an annular sector disc carton and a circular filter paper. The filter paper is placed concentrically in the disc carton when folded in a funnel fashion. A recess of triangular shape can be provided in the outer periphery to form a collar on the funnel.

1 Claim, 4 Drawing Figures

FILTER FOR BREWING COFFEE OR THE LIKE

The invention relates to an improvement of filters for brewing coffee, tea or the like. It is designed for throw-away use and for being used without a surrounding holder. The filter consists of a funnel-shaped carton which has a filter paper on its inside.

The object of the invention is to produce a filter for brewing coffee or similar beverages which eliminates the necessity of using the prior art holder which usually supports and surrounds the filter paper during brewing. The prior art holder is placed upon a can or the like, into which the coffee or the tea flows after being brewed. It is also an object of the invention to provide a filter that can be used as a throw-away package for the coffee or the like to be brewed so that the one who uses the filter does not necessarily have to bring the coffee separately in a bag or other container but only has to bring with himself the filter in which the right amount of the coffee is already packed.

The characterizing merits of the invention can be found from the enclosed claims.

An embodiment of the invention will be described below with reference to the accompanying drawing.

FIG. 1 thereby shows a side view of a filter according to the invention and of a certain size.

Figure 1:
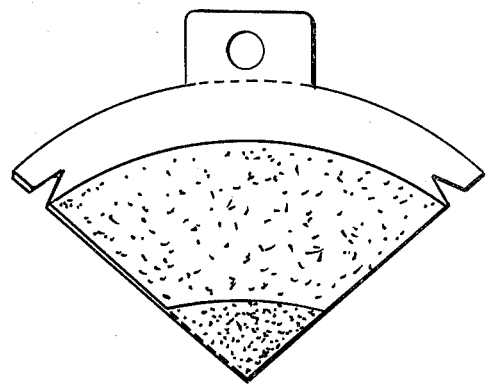
Figure 2:
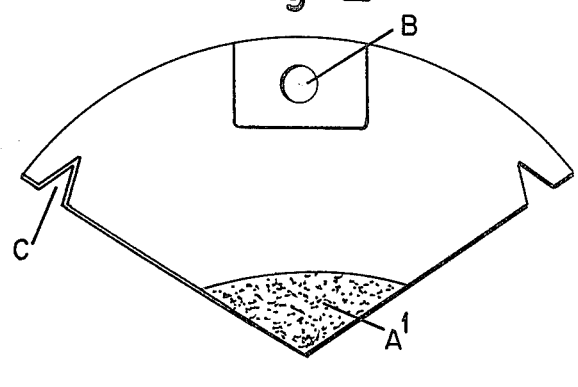
FIG. 2 shows a side view of a filter of a different size.
Figure 4:
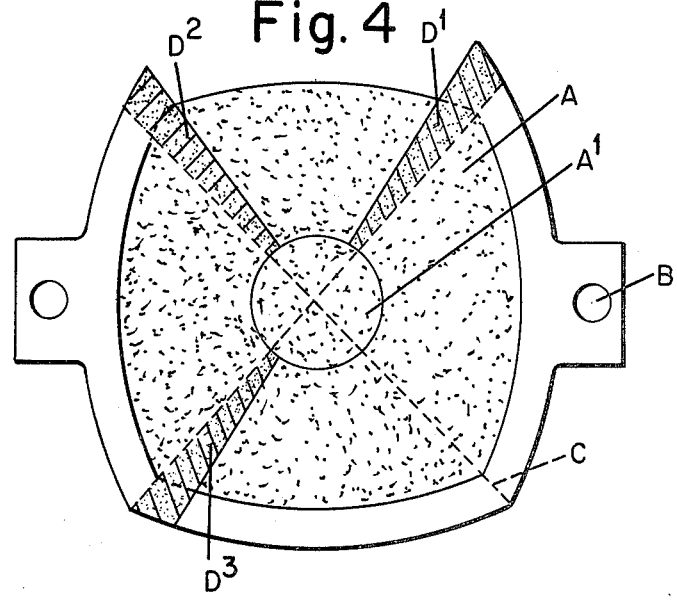
FIG. 4 shows the filter in plane or unfolded position.

The filter consists of a carton, which is ring-shaped in flat form and has a recess in the form of a sector, see FIG. 4. The recess is between two glue lines $D^1$ and $D^2$ in FIG. 4. $A^1$ is a circular recess in the center of the carton, whereby the ring form is established. A filter paper is placed on the carton and has the form of a circular disc, the center of which coincides with the center of the ring shape of the carton. The filter paper, which is denoted with A in FIG. 4, thus covers the circular recess $A^1$ and also the sector-shaped recess when the filter is in flat position, as shown in FIG. 4. The filter paper is fastened on the carton preferably along a peripheral line. It can be fastened also along a radial line or with one or several dots. It is to be observed, however, that the filter paper shall not be fastened onto the carton over its entire area because the filter paper must be able to adapt its form to the funnel-shaped form of the carton, when being erected as shown in FIG. 1 or 2. The funnel-shaped form is achieved when the glued area $D^1$ is placed on the glued area $D^2$. There after the carton will have a funnel-shape with a certain conical angle. If on the other hand the glued area $D^1$ is placed on a third glued area $D^3$, which is placed diametrically to the glued area $D^1$, the carton will have a second funnel form with a second conical angle, which is smaller than the first one. The form of the filter paper following always the form of the carton. This can be achieved by folding the filter paper accordingly, so that the filter paper is placed always close to the inside of the carton.

Figure 3:
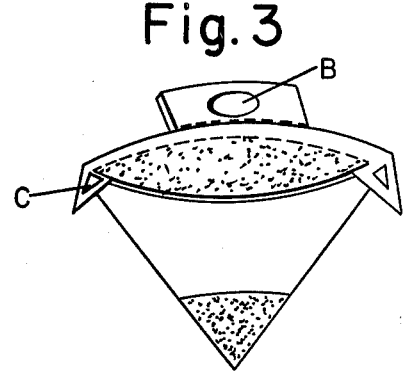
FIG. 3 shows a perspective view of the filter when being used.

FIGS. 2-4 show a triangular recess C being arranged in the peripheral area of the carton. The triangular recesses are placed diametrically opposed and an apex is directed radially outwards. If the recess has a triangular form with equal sides, the side between those two sides preferably is placed transversely to the diameter, which divides the angle in two similar portions. When the carton is erected to the funnel form, the peripheral area of the carton is folded so that a collar is formed. The established folding line passes through the recesses; thus the carton is stiffened in its opened form.

There are other embodiments of the invention within the scope of the following claims. Thus, the peripherial conture of the carton may have corners instead of a pure circle form and the recess in the center of the carton may be a part of a circle disc for instance a small sector or the like. The carton may be a complete circular disc and the funnel-shape is achieved by folding the disc along to radial lines instead of a sector formed recess being cut out of the carton. Instead of cuting out the recess in the center of the carton, tear off lines may be arranged so that the recess will be established after the carton being erected by manually tearing away a small part of the area around the tip of the carton.

I hereby claim:

1. Filter for brewing coffee, tea or the like, intended to throw-away use and for being used without a supporting holder, consisting of a carton having the form of an annular disc having a sector quadrant removed when being in a flat position and having a funnel-shaped form when being erected, and a circular filter paper being placed concentrically on the inside of the carton whereby water is able to pour through the filter in the center area; wherein a recess of triangular form is formed in the outer periphery of the carton, an apex of the recess being directed radially outwards, whereby in erected position of the carton the peripheral area of the carton can be folded along a peripheral line through the recesses so that a collar is formed around the carton.

* * * * *